United States Patent
Wigren et al.

(10) Patent No.: US 10,455,591 B2
(45) Date of Patent: Oct. 22, 2019

(54) APPARATUSES, METHODS, COMPUTER PROGRAMS, AND COMPUTER PROGRAM PRODUCTS FOR INTERFERENCE AVOIDANCE

(71) Applicant: TELEFONAKTIEBOLAGET LM ERICSSON (PUBL), Stockholm (SE)

(72) Inventors: Torbjörn Wigren, Uppsala (SE); Mats Åhlander, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 13 days.

(21) Appl. No.: 15/526,382

(22) PCT Filed: Apr. 25, 2017

(86) PCT No.: PCT/SE2017/050405
§ 371 (c)(1),
(2) Date: May 12, 2017

(87) PCT Pub. No.: WO2018/199819
PCT Pub. Date: Nov. 1, 2018

(65) Prior Publication Data
US 2018/0310317 A1   Oct. 25, 2018

(51) Int. Cl.
*H04L 12/28* (2006.01)
*H04W 72/08* (2009.01)
(Continued)

(52) U.S. Cl.
CPC ........ *H04W 72/082* (2013.01); *H04B 7/0417* (2013.01); *H04B 7/0456* (2013.01);
(Continued)

(58) Field of Classification Search
CPC ...................................................... H04L 12/50
(Continued)

(56) References Cited

U.S. PATENT DOCUMENTS

| 2005/0064872 A1 | 3/2005 | Osseiran et al. |
| 2016/0095003 A1 | 3/2016 | Yu et al. |
| 2018/0241526 A1* | 8/2018 | Chendamarai Kannan .......... H04L 5/0048 |

FOREIGN PATENT DOCUMENTS

| WO | 2015157565 A1 | 10/2015 |
| WO | 2017164593 A1 | 9/2017 |

OTHER PUBLICATIONS

International Search Report and Written Opinion issued in Application No. PCT/SE2017/050405 dated Mar. 6, 2018, 15 pages.
(Continued)

*Primary Examiner* — Dang T Ton
(74) *Attorney, Agent, or Firm* — Rothwell, Figg, Ernst & Manbeck, P.C.

(57) ABSTRACT

A scheduling function node (SF) uses the beams available for each WCD to avoid scheduling a transmission that would imply that interference between WCDs is created. In the simplest form such a scheme could be described as follows: (1) avoid scheduling transmission in directions that coincide between WCDs (here, a direction would typically be represented by both azimuth and elevation angles) and (2) when the available beam directions do not allow interference avoidance, accounting for this fact and exploiting other types of orthogonality in the scheduling of time-frequency resources.

20 Claims, 8 Drawing Sheets

(51) Int. Cl.
   *H04W 72/04* (2009.01)
   *H04B 7/06* (2006.01)
   *H04B 7/0417* (2017.01)
   *H04B 7/0456* (2017.01)

(52) U.S. Cl.
   CPC ......... *H04B 7/0617* (2013.01); *H04B 7/0626* (2013.01); *H04B 7/0695* (2013.01); *H04W 72/044* (2013.01)

(58) Field of Classification Search
   USPC ....................................................... 370/400
   See application file for complete search history.

(56) References Cited

OTHER PUBLICATIONS

ZTE, ZTE Microelectronics: "Overview of Duplexing and Interference Management", 3GPP TSG RAN WG1, Meeting #88bis, R1-1704433, Spokane, WA, USA, Apr. 3-7, 2017, 10 pages.

Catt: "DL/UL scheduling mechanisms for NR", 3GPP TSG RAN WG1, Meeting #88bis, R1-1704582, Spokane, WA, USA, Apr. 3-7, 2017, 4 pages.

Samsung: "Cross-link interference management based on coordinated beamforming", 3GPP TSG RAN WG1, Meeting #88bis, R1-1705431, Spokane, WA, USA, Apr. 3-7, 2017, 9 pages.

Wigren et al.: "Implication of RF EMF Exposure Limitations on 5G Data Rates above 6 GHz," Proc. VTC 2015 Fall, Boston, MA, Sep. 6-9, 2015, 6 pages.

\* cited by examiner

APPARATUSES, METHODS, COMPUTER PROGRAMS, AND COMPUTER PROGRAM PRODUCTS FOR INTERFERENCE AVOIDANCE

CROSS REFERENCE TO RELATED APPLICATION(S)

This application is a 35 U.S.C. § 371 National Stage of International Patent Application No. PCT/SE2017/050405, filed Apr. 25, 2017, designating the United States, which is incorporated by reference.

TECHNICAL FIELD

Disclosed are embodiments related to interference avoidance in communication systems that employ beamforming.

BACKGROUND

1. Beamforming

The next generation mobile wireless communication system, which is referred to as "5G," will support a diverse set of use cases and a diverse set of deployment scenarios. 5G will encompass an evolution of today's 4G LTE (Long Term Evolution) networks and the addition of a new, globally standardized radio-access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ beamforming (e.g., high-gain beamforming) to achieve satisfactory link budget.

Beamforming is an important technology in future radio communication systems. It can improve performance both by increasing the received signal strength, thereby improving the coverage, and by reducing unwanted interference, thereby improving the capacity. Beamforming can be applied both in a transmitter and a receiver.

In a transmitter, beamforming involves configuring the transmitter to transmit the signal in a specific direction ("beam"), or in two or more directions, and not in other directions. In a receiver, beamforming involves configuring the receiver to receive signals from a certain direction (or a few directions) and not from other directions. When beamforming is applied in both the transmitter and the receiver for a given communication link, the combination of the beam used by the transmitter to transmit a signal to the receiver and the beam used by the receiver to receive the signal is referred to as a beam-pair link (BPL). Generally, the beamforming gains are related to the widths of the used beams: a relatively narrow beam provides more gain than a wider beam. A BPL can be defined for DL and UL separately or jointly based on reciprocity assumptions.

For a more specific description of beamforming, one typically talks about beamforming weights rather than beams. On the transmission side, the signal to be transmitted is multiplied with beamforming weights (e.g., complex constants) before being distributed to the individual antenna elements. There are separate beamforming weights for each antenna element, which allows maximum freedom in shaping the transmission beam given the fixed antenna array. Correspondingly, on the receiving side, the received signal from each antenna element is multiplied separately with the beamforming weights before the signals are combined.

However, in the context of the present text, the description is easier to follow if the somewhat simplified notion of beams, pointing in certain physical directions, is adopted.

Beamforming is a mature subject today. This section just aims at presenting the basics. Referring now to FIG. 1, FIG. 1 shows an idealized one-dimensional beamforming case. In case it is assumed that a wireless communication device (WCD) (e.g., a user equipment (UE), such as a smartphone, laptop, tablet, phablet etc.; a machine-type communication device, such as a smart appliance, a sensor, etc.; or other device capable of wireless communication) is located far away from the antenna array it follows that the difference in travel distance from the base station to the WCD, between adjacent antenna elements, is $l=k\lambda \sin(\theta)$, where $k\lambda$ is the antenna element separation. Here k is the separation factor which may be 0.5-0.7 in a typical correlated antenna element arrangement. This means that if a reference signal $s_i e^{j\omega t}$ transmitted from the i:th antenna element will arrive at the WCD antenna as a weighted sum $$s_{UE} = \sum_{i=0}^{N-1} s_i h_i e^{j\omega\left(t-\frac{il}{c}\right)} = e^{j\omega t}\sum_{i=1}^{N-1} s_i h_i e^{-j\frac{ik\lambda\sin(\theta)}{f_c\lambda}} = e^{j\omega t}\sum_{i=1}^{N-1} s_i h_i e^{-j\frac{ik\sin(\theta)}{f_c}}.$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the WCD therefore needs to search for all complex channel coefficients $h_i$ and the unknown angle $\theta$. For this reason the standard defines a codebook of beams in different directions given by steering vector coefficients like $w_{m,i}=e^{-jf(m,i)}$, where m indicates a directional codebook entry. The WCD then tests each codebook and estimates the channel coefficients. The information rate achieved for each codebook entry m is computed and the best one defines the direction and channel coefficients. This is possible since $s_i$ is known. The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission the MIMO beamforming weight matrix W needs to be determined so that a best match to the requirement WH=I is achieved where I denotes the identity matrix. In case of an exact match each layer will become independent of other layers. This concept can be applied for single users or multiple users.

When reciprocity is used the channel coefficients can, in principle, be directly estimated by the base station from WCD uplink transmission. So called sounding reference signals, SRS, are used for this purpose. The estimated channel is then used to compute the combining weight matrix according to some selected principle, and then used for downlink transmission. This works since the uplink and downlink channels are essentially the same when reciprocity is applicable.

2. 5G 3GPP Reference Signals Supporting Beamforming

Some of the description herein is given in terms of the 3GPP terminology for the 4G LTE system, since the standardization of the 5G counterparts is not yet finalized. The operation of the 5G functionality is expected to be essentially the same as in the 4G system.

The channel state information reference signals, CSI-RS, which has been available since release 11, are assigned to a specific antenna port. These reference signals may be transmitted to the whole cell or may be beamformed in a WCD specific manner. In 3GPP from release 13 two classes of CSI-RS reporting mode has been introduced: class A CSI-RS refers to the use of fixed-beam codebook based beamforming, while a class B CSI-RS process may send beamformed CSI-RS in any manner.

A CSI-RS process in a WCD comprises detection of selected CSI-RS signals, measuring interference and noise on a CSI Interference Measurement (CSI-IM) resource, and reporting of the related CSI information, in terms of CQI, RI and PMI. Here CSI denotes channel state information, CQI denotes channel quality indication, RI denotes (channel matrix) rank indications and PMI denotes pre-coder matrix index, i.e. the selected codebook entry. A WCD may report more than one set of CQI, RI and PMI, i.e. information for more than one codebook entry. Up to 4 CSI-RS processes can be set up for each WCD, starting in 3GPP release 11.

3. 5G 2D Codebooks and Antenna Port Relations

As stated above the codebook of the 3GPP standard is defined to represent certain directions. In release 13, directions in both azimuth and elevation is defined, thereby allowing 2D beamforming to be used. These 4G codebooks are specified in detail in 3GPP TR 36.897. A similar definition, but with finer granularity is expected for the 3GPP 5G standard.

In order to illustrate that the codebooks indeed define specific directions, it can be noted that the formula for the azimuth codebook is $$w_k = \frac{1}{\sqrt{K}} \exp\left(-j\frac{2\pi}{\lambda}(k-1)d_V \cos\theta_{etilt}\right) \text{ for } k = 1, \ldots, K.$$

It has the same structure as discussed above. Similarly, the vertical codebook in that document is given by $$v_{l,i} = \frac{1}{\sqrt{L}} \exp\left(-j\frac{2\pi}{\lambda}(l-1)d_H \sin\vartheta_i\right) \text{ for } l = 1, \ldots, L.$$

In the two above equations it is only the structure that is needed here, the details of the involved quantities is of less importance and is not reproduced here, see 3GPP TR 36.897 for all details. Finally, it is noted that a 2D beam is obtained by a multiplication of the two above equations.

4. Interference Avoidance with RAIT

Reciprocity-assisted interference aware transmission (RAIT) is a technique that is applicable primarily for Time Division Duplex (TDD) deployments, where channel reciprocity can be used. Briefly, RAIT offers a unified approach to single point techniques like MU-MIMO and beamforming, and to multi-point techniques like CoMP and D-MIMO. The key to achieve this is availability of a high fidelity multi-antenna element spatial 1D or 2D matrix channel estimate H. Since reciprocity is normally assumed to hold for RAIT, the channel matrix can be estimated by application of e.g. sounding reference signals (SRS) in the uplink. The channel matrix is then also valid for downlink transmission. By formulation of a criterion that embeds the above techniques as special cases, a combining weight matrix W can then be computed and used to steer the downlink transmit power in an optimal way. One particular feature of RAIT is that it is capable to avoid transmission in directions where interference is likely to be created, between users.

SUMMARY

As noted above, in the coming 5G cellular systems, beamforming will be a central technology. The reason is that spectral resources are running out at low carrier frequencies which leads to a gradual migration into the mmw band. There beamforming and a use of massive antenna arrays are needed to achieve a sufficient coverage. There is available spectrum around 28 GHz and 39 GHz in the US and other markets, and this spectrum needs to be exploited to meet the increasing capacity requirements. The 5G frequency migration is expected to start at 3.5-5 GHz, and then continue to these soon available 28 GHz and 39 GHz bands.

Two main methods are available for wireless beamforming. The first method relies on the downlink and uplink utilizing the same frequency band. Then channel reciprocity persists and a matrix channel estimated for the uplink can be used for optimal beamforming in the downlink, requiring e.g. the beamforming weights for Multiple-Input-Multiple-Output (MIMO) to meet the equation WH=I, where H is the channel matrix. The other method relies on reference signals being transmitted from the base station, and by feedback information on signal quality being sent back from the WCD. In the 4G LTE standard the WCD typically measures the channel response and reports the result back to the base station in terms of CQI, RI and PMI, these quantities representing the quality (SNR related), channel rank, and preferred pre-coder, respectively. This is denoted channel state information (CSI) feedback. A similar development, with richer codebooks, is currently being developed for the 5G mmw standards.

One problem that arises with beamforming is interference. For example, it may be the case that the beams of two or more WCDs coincide, in which case the WCDs will create interference in case they are scheduled independently of each other, in the same physical resource blocks but in different layers. This disclosure aims to address this problem. For example, this disclosure describes, among other things, techniques for avoiding interference in communication systems that use high mmw frequency bands where digital beamforming algorithms like the RAIT algorithm may not be suitable.

Another problem that may be addressed by some embodiments is associated with the estimation of an as good as possible channel model, without application of reciprocity. Again, this is associated with the UL/DL power unbalance that increase above 6-10 GHz. Since the codebooks above represent single directions, a single codebook entry is not capable to represent signal energy from multiple directions, where the angular differences between directions are larger than the beam width. This means that useful energy in other directions may not be collected, which is negative for the possibility to transmit in interference avoiding directions. Note that such situations are not uncommon e.g. in cities and indoor environments where a LOS connection may not be available, leaving the communication to rely on multiple reflected paths.

A further problem that may be addressed by some embodiments occurs in case of an established single beam connection between a base station and a WCD. At least when narrow beams are used, the beam and transmission quality could deteriorate rapidly in case transmission to an interfering WCD in the same direction occurs. The dropped call probability is likely to increase with the inverse of the beam width, simply the interfering beam power may become substantial.

Still another problem is associated to the computational complexity associated with an implementation of RAIT on mmw frequency bands. There massive beam forming gains will be needed to achieve a sufficient coverage. Now, RAIT has a computational complexity that is proportional to the number of antenna elements of the antenna array, raised to the power of three. At low band antenna array sizes of 32 to 64 will be typical initially, and then RAIT is on the limit of being implementable. At mmw bands antenna sizes ranging from 128 to at least 512 antenna elements are expected, this being about a factor of 10 higher than at low bands. The computational complexity at high mmw bands could therefore be 10^3=1000 times higher than at low bands, due to this fact alone. In addition, the channel decorrelation time in mobility is typically equal to the time it takes for the mobile to travel half a wavelength. Therefore, the channel decorrelation times are about ten times less at high mmw frequencies than at low bands. This means that RAIT computations will have to be completed 10 times faster than at low bands in case reciprocity is to be used. This fact may add to the computational complexity of RAIT at high bands. To summarize, RAIT complexity could be more than 1000 times as computationally intense at mmw bands as compared to low bands. This would then make RAIT impossible to implement at mmw bands, at least in basic form.

In one aspect there is provided a method for interference avoidance. In some embodiments, the method includes a network node (e.g., a base station or other network node) obtaining first candidate beam information identifying a first set of one or more candidate beams for a first wireless communication device (WCD) being served by the network node, the first set of candidate beams for the first WCD comprising a first candidate beam having a first direction. The method further includes the network node obtaining second candidate beam information identifying a second set of one or more candidate beams for a second WCD (390) being served by the network node, the second set of candidate beams for the second WCD comprising a second candidate beam having a second direction. The network node uses the first and second candidate beam information to schedule i) the transmission of first data to the first WCD and ii) the transmission of second data to the second WCD. The scheduling of the transmissions comprises: selecting a transmission resource for use in transmitting the first data to the first WCD, selecting a transmission resource for use in transmitting the second data to the second WCD, and determining whether the first direction is different than the second direction.

In some embodiments, selecting a transmission resource for use in transmitting the first data to the first WCD comprises selecting one or more of: i) a time slot during which the transmission of the first data to the first WCD will occur and ii) a frequency band in which the transmission of the first data to the first WCD will occur, and selecting a transmission resource for use in transmitting the second data to the second WCD comprises selecting one or more of: i) a time slot during which the transmission of the second data to the second WCD will occur and ii) a frequency band in which the transmission of the second data to the second WCD will occur. Selecting the transmission resource for use in transmitting the first data to the first WCD may further comprise selecting a candidate beam from the first set of candidate beams for the first WCD; and selecting the transmission resource for use in transmitting the second data to the second WCD may further comprise selecting a candidate beam from the second set of candidate beams for the second WCD.

In some embodiments, scheduling i) the transmission of first data to the first WCD and ii) the transmission of second data to the second WCD using the first and second candidate beam information comprises: using the first and second candidate beam information to determine whether it is feasible to select the same time and frequency resources for the transmission of the first data to the first WCD and the transmission of the second data to the second WCD. In some embodiments, the step of using the first and second candidate beam information to determine whether it is feasible to select the same time and frequency resources comprises: determining whether there is at least one beam included in the set of candidate beams for the first WCD that is not included in the set of candidate beams for the second WCD; and determining whether there is at least one beam included in the set of candidate beams for the second WCD that is not included in the set of candidate beams for first WCD. As a result of determining that it is feasible to select the same time and frequency resources, the network node may select a time and frequency resource for the transmission of the first data and select for the second transmission the same time and frequency resources that are selected for the transmission of the second data.

In some embodiments, selecting a candidate beam from the first set of candidate beams for the first WCD comprises: 1) determining a first subset of candidate beams for the first WCD, wherein each candidate beam included in the first subset of candidate beams is a) included in the first set of candidate beams and b) not included in the second set of candidate beams; and 2) selecting a candidate beam from the first subset of candidate beams. In some embodiments, selecting a candidate beam from the second set of candidate beams for the second WCD comprises: 1) determining a second subset of candidate beams for the second WCD, wherein each candidate beam included in the second subset of candidate beams is a) included in the second set of candidate beams and b) not included in the first set of candidate beams; and 2) selecting a candidate beam from the second subset of candidate beams.

In some embodiments, the first beam is defined by a codebook entry identified by a pre-coder matrix index; and the method further comprises: a) the network node using the first beam to transmit a reference signal and b) the network node receiving from the first WCD first channel state information comprising the pre-coder matrix index and first channel quality information. In some embodiments, the network node is a base station having more antenna elements than antenna ports, and the method further comprises: a) the network node using a third beam to transmit the reference signal, wherein the third beam is associated with the pre-coder matrix index, b) after transmitting the reference signal using the third beam, the network node receiving from the first WCD second channel state information comprising the pre-coder matrix index and second channel quality information, and c) the network node determining whether to add the third beam to the first set of candidate beams based on the second channel quality information received from the first WCD.

In some embodiments, the method also includes: a) the network node using a fourth beam to transmit the reference signal, wherein the fourth beam is associated with the pre-coder matrix index, b) after transmitting the reference signal using the fourth beam, the network node receiving from the first WCD third channel state information comprising the pre-coder matrix index and third channel quality information, and c) the network node determining whether to add the fourth beam to the first set of candidate beams based on the third channel quality information received from the first WCD. The third beam is angularly shifted with respect to the first beam in a first direction, and the fourth beam is angularly shifted with respect to the first beam in a second direction.

In some embodiments, the method also includes the network node obtaining the first data for transmission to the first WCD; and the network node obtaining the second data for transmission to the second WCD.

Advantages

A principle advantage of embodiments described herein includes improved capacity and reduced interference. Other advantages include: 1) backward compatible solution, including LTE releases from release 11; 2) optimal use of more spatial dimensions, when feedback type beamforming is applied; 3) resource efficient background beam scan, by the use of cell specific CSI-RS for the scan, allowing all WCDs to share the scan resource; 4) a much smaller computational complexity than RAIT at high mmw bands. Also, embodiments can be used in situations without channel reciprocity assistance, thereby complementing RAIT.

BRIEF DESCRIPTION OF THE DRAWINGS

The accompanying drawings, which are incorporated herein and form part of the specification, illustrate various embodiments.

DETAILED DESCRIPTION

Figure 1:
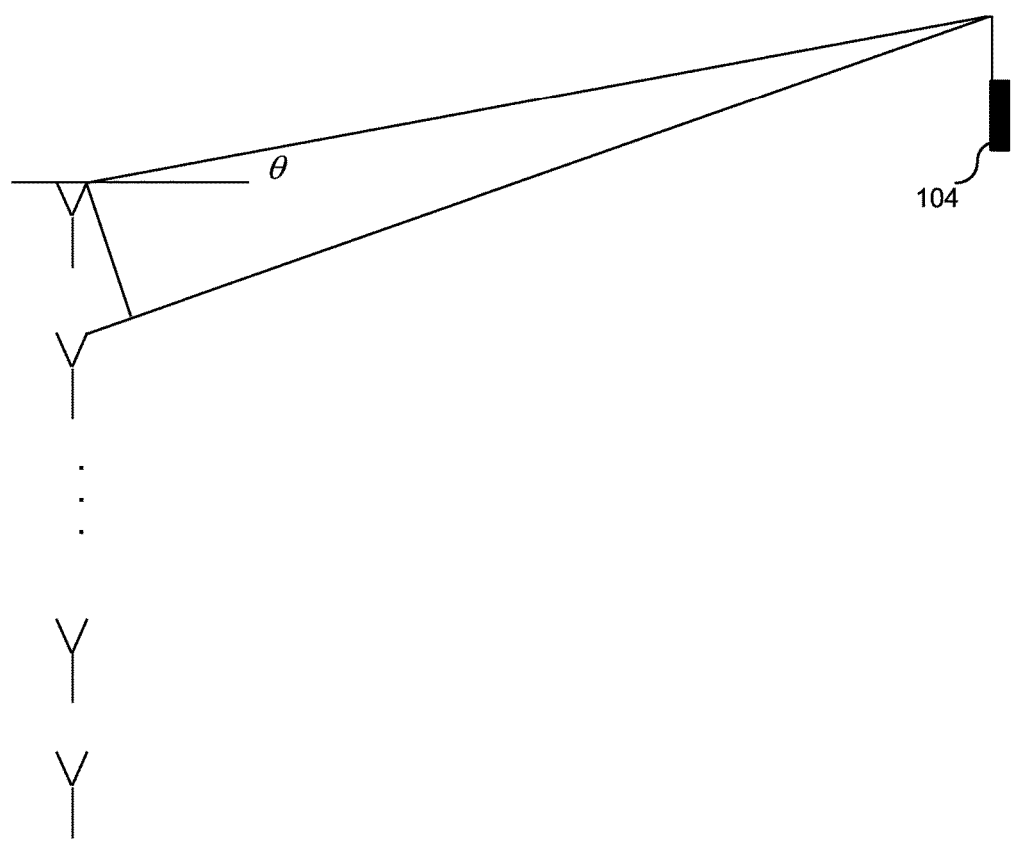
FIG. 1 shows an idealized one-dimensional beamforming case.
Figure 2:
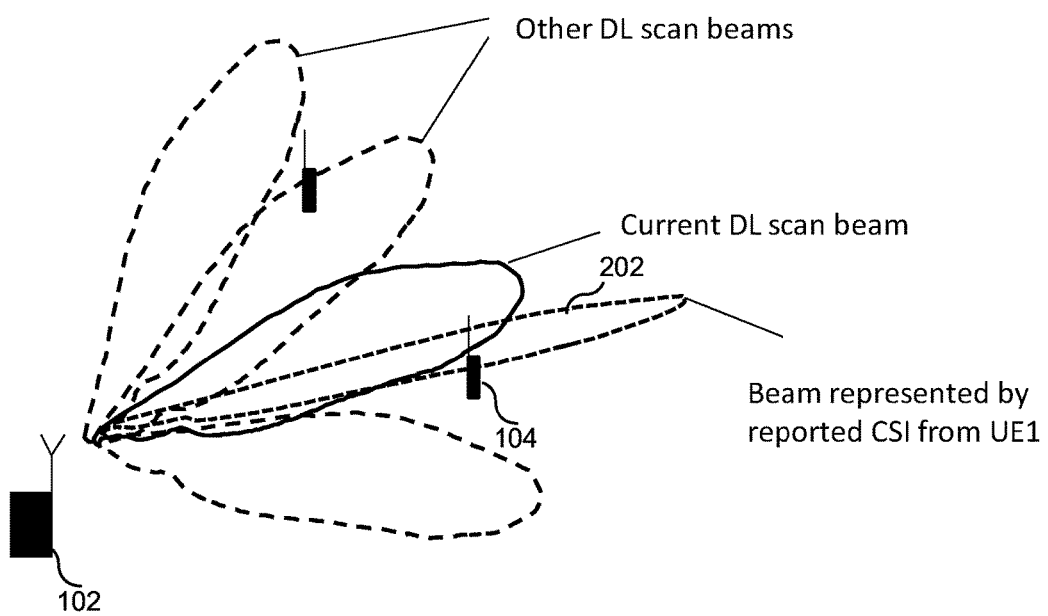
FIG. 2 depicts an ongoing communication process between a base station and a WCD.

FIG. 2 depicts a communication process between a base station 102 and a WCD 104. In this illustration, one beam (i.e., beam 202) is used that utilizes a line-of-sight (LOS) propagation path. A WCD-specific CSI/RS process is used to support the transmission. The exact beam former applied may be based on the exact codebook directions fed back when the beam was first searched for. Note that in case a wider beam was used for this search, the feedback would have provided a more precise beam direction, via PMI feedback.

Figure 3:
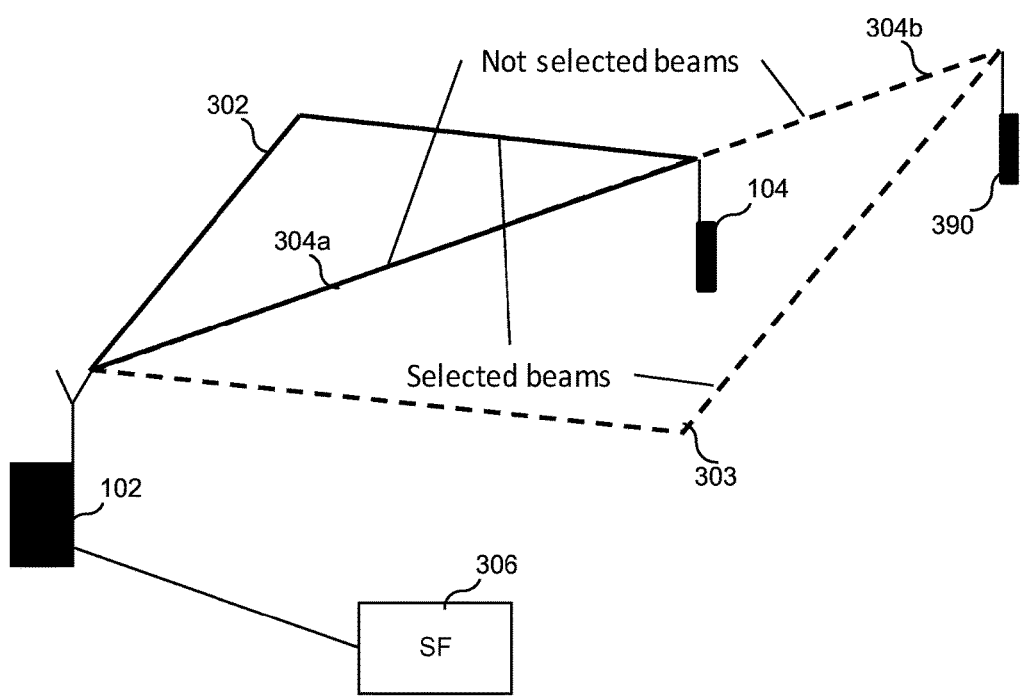
FIG. 3 illustrates a reflected path to a WCD.

FIG. 3 shows an example in which WCD 104 can also be reached with a reflected beam 302. That direction has not yet been detected in the WCD. However, the proposed beam scan function is operating in the background by a second cell specific CSI-RS process common for all WCDs in the cell. WCD 104 measures the signal on the cell-specific CSI-RS process and reports back CQI, while the base station transmits the CSI-RS signal at the same configured occasions. In this way the WCD 104 can finally detect signal energy in the new direction, and a secondary beam may be added, by assigning another WCD specific CSI-RS process.

A scheduling function node (SF) 306 uses the multiple beam directions available for each WCD to avoid a scheduling decision that would imply that interference between WCDs is created. In the simplest form such a scheme could be described as follows: (1) avoid scheduling transmission in directions that coincide between WCDs (here, a direction would typically be represented by both azimuth and elevation angles) and (2) when the available beam directions do not allow interference avoidance, accounting for this fact and exploiting other types of orthogonality in the scheduling of time-frequency resources. More advanced schemes, that weigh the estimated amount of created interference against the gain associated with using transmit directions with a high channel gain can of course also be used. While SF 306 is shown in FIG. 3 as being separate and apart from base station 102, this is not a requirement as SF 306 may be a component of base station 102.

Figure 4:
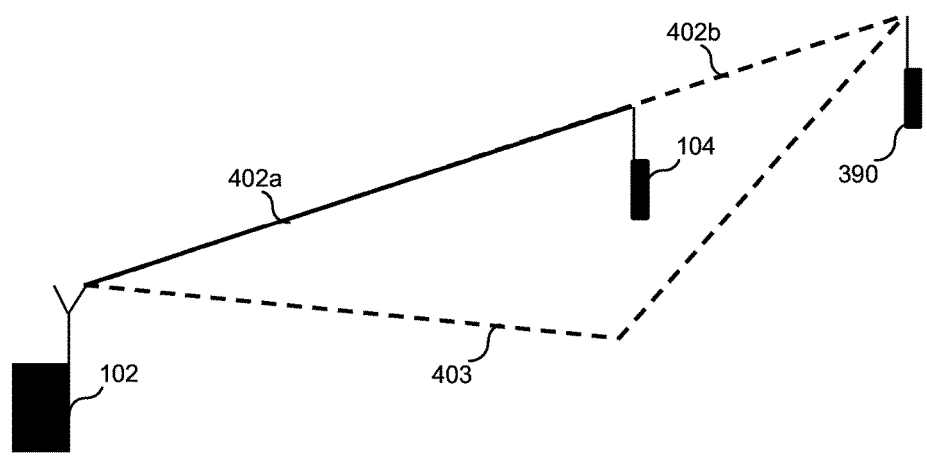
FIG. 4 illustrates a case when the scheduler detects that directions are not available for interference avoidance between WCDs

FIG. 3 illustrates a case were beamformed directions are available that allows interference avoiding downlink transmission to take place. More specifically, FIG. 3 shows that beam 302 can be used by base station 102 to transmit data to WCD 104 and further shows that a different beam (beam 303) can be used by base station 102 to simultaneously transmit data to WCD 390 (the transmission to WCD 390 may also use the same frequency resources as the simultaneous transmission to WCD 104 because the beam 303 used for transmitting the data to WCD 390 has a low likelihood of interfering with the beam 302 used to transmit the data to WCD 104 because the two beams follow different paths). FIG. 4 illustrates a case when the scheduler detects that different beams are not available for interference avoidance between WCDs 104 and 390, and where the scheduler schedules WCDs 104 and 390 to disjoint parts of the time-frequency resource grid. In other words, because the only beam available for WCD 104 (i.e., beam 402) is a beam that would also be received by WCD 390, the scheduler may determine that the best way to avoid interference is to schedule WCD 104 and WCD 390 such that the scheduled transmissions are not performed at the same time and/or are not performed using the same frequency resources.

As illustrated above, by making use of information that identifies the beams that are available for each WCD, the SF 306 is able to schedule transmissions to two more WCDs such that the transmissions occur using the same time and frequency resources, but using different beams, thereby reducing the likelihood of interference yet also increasing system capacity. The following describes one way in which base station 102 can determine available beams for each WCD that is being served by the base station 102.

Beam Search

Base station 102 selects a set of cell specific CSI-RS processes and performs setup of a beam scan pattern, on the time-resource grid used in 5G. The beam scan pattern may be selected to be a sequence of beams selected from the code book of the standard. The WCDs that are subject to beam scan are selected, according to selected priorities, the service, or another criterion. Note that all WCDs may not be subject to beam scan. The selected WCDs are configured with at least a subset of the cell specific set of CSI-RS processes. The selected reporting options are also configured. This may comprise a reporting of more than one beam direction per reporting instance. The following steps are then repeated: 1) the base station transmit the cell specific CSI-RSs according to the selected scan pattern, 2) the WCDs configured with the appropriate cell specific CSI-processes, perform CSI-RS detection, reporting CSI information in line with the 3GPP 5G standard, 3) the CSI feedback information is received in the base station, for each WCD configured with the cell-specific CSI-RS processes in question, 4) The base station uses the received feedback information to update the channel matrix for each WCD configured with the cell-specific CSI-RS processes, 5) the base station may determine to add beam directions with sufficiently high energy to ongoing beamformed transmissions, 6) the base station computes new beam forming/transmission weights for all WCDs, and continues transmission according to the weights, 7) the base station may configure beam scan for additional WCDs, and/or remove existing configurations of beam scan, from WCDs currently being subject to a beam scan.

Refined Beam Search

In case the number of antenna elements is larger than the number of antenna ports, the beamwidth and antenna gain offered by the codebook can be reduced and increased, respectively. This requires using the available antenna elements to do beamforming in a more advantageous direction than offered by the selected codebook entry.

Figure 5:
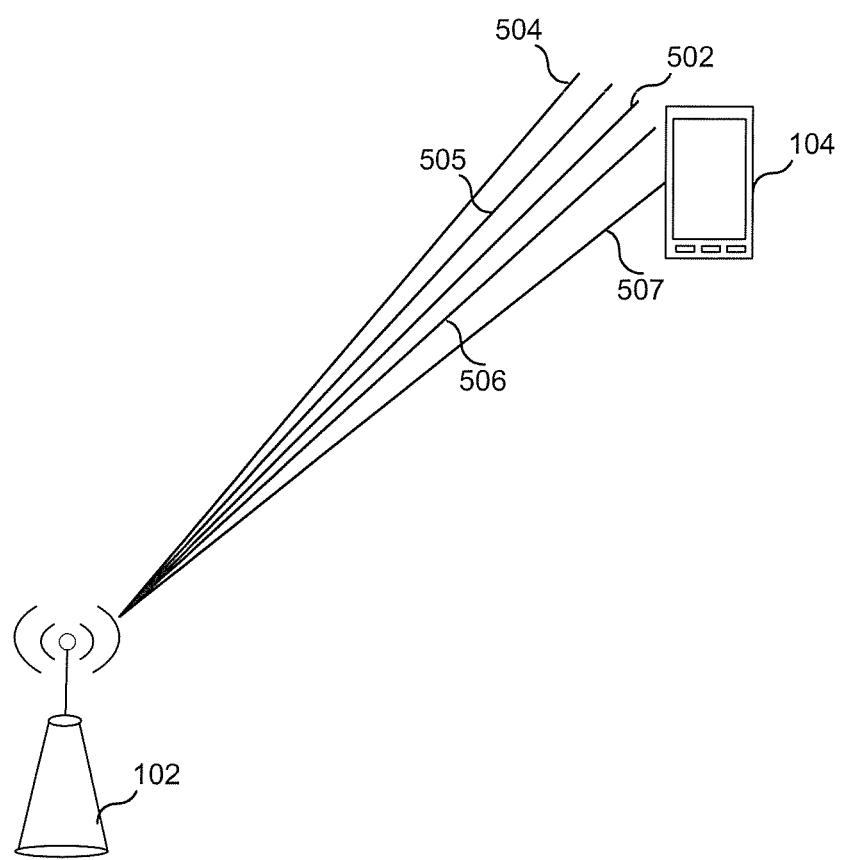
FIG. 5 illustrates oversampling.

In order to find such a direction a spatial oversampling procedure is suggested here. The oversampling is illustrated by FIG. 5. In FIG. 5 it is assumed that there are more antenna elements than antenna ports. Spatial oversampling then allows beams to be formed with directions on each side of a beam 502 defined by a codebook entry. The base station 102 then schedules subsequent beamformed transmissions in these oversampled directions (e.g., beams 504, 505, 506, and 507), and collects CSI-information from WCD 104. This search uses each of the WCD specific CSI-RS processes that have been obtained from the beam search above. The best CQI is used as an indication of a best oversampled direction. This direction is selected for beamforming ahead in time. For example, the base station 102 may transmit the CSI-RS using beam 504 and then wait to receive a CSI report from the WCD. Base station 102 can repeat this step for each of beams 505-507 and then select one of the beams 504-507 or beam 502 depending on the CSI information received and add the selected beam to a set of candidate beams for WCD 104. The base station can then use the set of candidate beams for WCD 104 to make a scheduling decision as described below.

For example, in an embodiment the network node uses beam 502 (i.e., a "first" beam) to transmit a reference signal, wherein beam 502 is defined by a codebook entry identified by a pre-coder matrix index; and the network node receives from WCD 104 first channel state information comprising the pre-coder matrix index and first channel quality information. The network node then uses beam 504 to transmit the reference signal, wherein beam 504 is associated with the pre-coder matrix index. After transmitting the reference signal using beam 504, the network node receives from WCD 104 second channel state information comprising the pre-coder matrix index and second channel quality information. The network node then uses beam 505 to transmit the reference signal, wherein beam 505 is associated with the pre-coder matrix index. After transmitting the reference signal using beam 505, the network node receives from WCD 104 third channel state information comprising the pre-coder matrix index and third channel quality information. The network node determines whether to add one of beams 502, 504 and 505 to the first set of candidate beams based on the channel quality information received from WCD 104. Preferably, beam 504 is angularly shifted with respect to beam 502 in a first direction, and beam 505 is angularly shifted with respect to beam 502 in a second direction.

Scheduling DL Transmissions to Minimize Interference

For each WCD that is subject to joint directional interference aware scheduling, the PMIs and CQIs for each detected beam direction for the WCD is tracked. The PMIs define the directions to each WCD, while the CQIs define the corresponding channel quality, typically in terms of SNR or power. Using this information, the base station 102 can define for the each of the WCDs a set of one or more candidate beams for use in transmitting DL data to the WCD.

Figure 6:
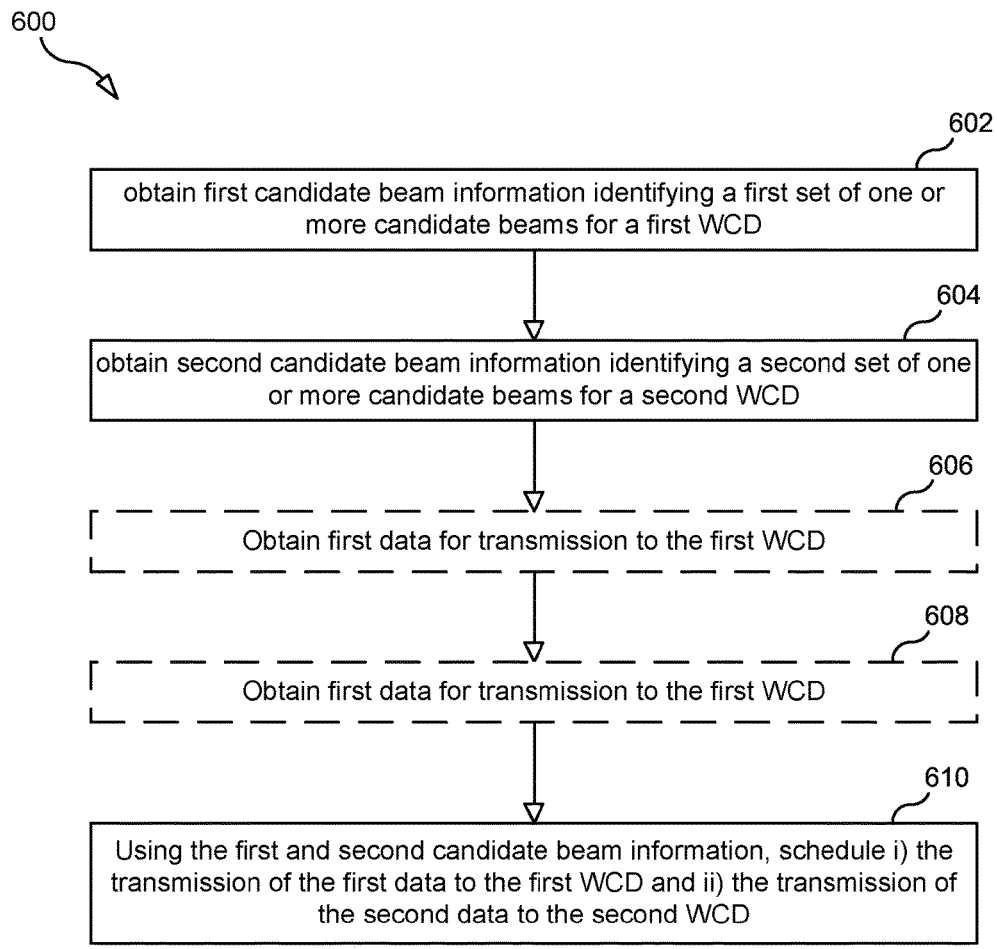
FIG. 6 is a flow chart illustrating a process according to some embodiments.

At each scheduling opportunity, the SF 306 selects transmission resources (e.g., beams, time slots, and frequencies) for each WCD, by means of an algorithm sensitive to the above PMI and CQI quantities, so that each WCD is scheduled to avoid interfering other users, when this is advantageous according to the scheduling algorithm, and possibly an underpinning criterion. The basic principles are depicted in FIG. 3 and FIG. 4, as described above. Many scheduling algorithms are possible. Traditional sequential ad hoc algorithms can, for example, be re-used, starting with a subset of WCDs at a time and testing all alternative beams for the subset, while using previous functionality for time-frequency scheduling. Alternatively, new joint criteria could be defined, followed by a solution to obtain optimal scheduling decisions. Also, the scheduling algorithms may be extended to cover clusters of cells, as in Ericsson's eRAN solution FIG. 6 is a flow chart illustrating a process 600 according to some embodiments. Process 600 may begin with step 602, in which a network node (i.e., base station 102 or another node that implements SF 306) obtains first candidate beam information identifying a first set of one or more candidate beams for WCD 104 (i.e., a "first" WCD that is being served by the network node 102,306). The first set of candidate beams for WCD 104 comprising a first candidate beam having a first direction.

In step 604, the network node obtains second candidate beam information identifying a second set of one or more candidate beams for WCD 390 (i.e., a "second" WCD that is being served by the network node). The second set of candidate beams for WCD 390 comprises a second candidate beam having a second direction.

In step 606, the network node obtains first data for transmission to WCD 104. In step 608, the network node obtains second data for transmission to WCD 390. Steps 606 and 608 are optional in scenarios in which SF 306 is not a component of base station 102. That is, in some embodiments, SF 306 performs all of the steps of FIG. 6 except steps 606 and 608, which are performed by base station 102.

In step 610, the network node, using the first and second candidate beam information, schedules i) the transmission of the first data to WCD 104 and ii) the transmission of the second data to WCD 390. The scheduling of the transmissions comprises: selecting a transmission resource for use in transmitting the first data to WCD 104, selecting a transmission resource for use in transmitting the second data to WCD 390, and determining whether the first direction is different than the second direction.

For example, if it is determined that: i) the candidate beams for the WCD 104 includes only a first beam having a first direction (e.g., beam 302), ii) the candidate beams for the WCD 390 includes only a second beam having a second direction (e.g., beam 303), and iii) the first direction is different than the second direction, then it may be feasible for the network node to select the same time and frequency resources for the respective transmissions to WCD 104 and WCD 390 because the first beam can be used to transmit the data to WCD 104, the second beam can be used to transmit the data to WCD 390, and the two beams will not interfere with each other.

As another example, if it is determined that: i) the candidate beams for the WCD 104 includes only a first beam having a first direction (e.g., beam 402a), ii) the candidate beams for the WCD 104 includes a second beam having a second direction (e.g. beam 403) and a third beam having a third direction (e.g., beam 402b) that is the same as the first direction (i.e., the direction of the first beam 402a is the same as the direction of the third beam 402b), then it would not be advisable for the network node to select the same time and frequency resources for the respective transmissions to WCD 104 and WCD 390 because the only beam that is available for the transmission to WCD 104 is beam 402a, which beam would also be received by WCD 390, thereby potentially causing interference. This example is illustrated in FIG. 4.

More generally, if: a) there is at least one beam included in the candidate beams for WCD 104 that is not included in the candidate beams for WCD 390 and b) there is at least one beam included in the candidate beams for WCD 390 that is not included in the candidate beams for WCD 104, then it may be feasible for the network node to select the same time and frequency resources for the respective transmissions to WCD 104 and WCD 390. This example is illustrated in FIG. 3, which shows that the set of candidate beam for WCD 104 includes beams 302 and 304a and the set of candidate beam for WCD 390 includes beams 303 and 304b. That is, as shown in FIG. 3, there is at least one beam included in the candidate beams for WCD 104 that is not included in the candidate beams for WCD 390 (i.e., beam 302) and there is at least one beam included in the candidate beams for WCD 390 that is not included in the candidate beams for WCD 104 (i.e. beam 303).

Accordingly, step 610 may include using the first and second candidate beam information to determine whether it is feasible to select the same time and frequency resources for the transmission of the first data to WCD 104 and the transmission of the second data to WCD 390. And this step of using the first and second candidate beam information to determine whether it is feasible to select the same time and frequency resources may include: determining whether there is at least one beam included in the set of candidate beams for WCD 104 that is not included in the set of candidate beams for WCD 390; and determining whether there is at least one beam included in the set of candidate beams for WCD 390 that is not included in the set of candidate beams for WCD 104. In some embodiments, as a result of determining that it is feasible to select the same time and frequency resources, the network node selects a time and frequency resource for the transmission of the first data and selects for the second transmission the same time and frequency resources that are selected for the transmission of the second data.

In some embodiments, selecting a transmission resource for use in transmitting the first data to WCD 104 comprises selecting one or more of: i) a time slot during which the transmission of the first data to WCD 104 will occur and ii) a frequency band in which the transmission of the first data to WCD 104 will occur, and selecting a transmission resource for use in transmitting the second data to WCD 390 comprises selecting one or more of: i) a time slot during which the transmission of the second data to WCD 390 will occur and ii) a frequency band in which the transmission of the second data to WCD 390 will occur. Selecting the transmission resource for use in transmitting the first data to WCD 104 may further comprise selecting a candidate beam from the first set of candidate beams for WCD 104, and selecting the transmission resource for use in transmitting the second data to WCD 390 may further comprise selecting a candidate beam from the second set of candidate beams for WCD 390. In some embodiments, selecting a candidate beam from the first set of candidate beams for WCD 104 comprises: 1) determining a first subset of candidate beams for WCD 104, wherein each candidate beam included in the first subset of candidate beams is a) included in the first set of candidate beams and b) not included in the second set of candidate beams; and 2) selecting a candidate beam from the first subset of candidate beams; and selecting a candidate beam from the second set of candidate beams for WCD 390 comprises: 1) determining a second subset of candidate beams for WCD 390, wherein each candidate beam included in the second subset of candidate beams is a) included in the second set of candidate beams and b) not included in the first set of candidate beams; and 2) selecting a candidate beam from the second subset of candidate beams.

Figure 7:
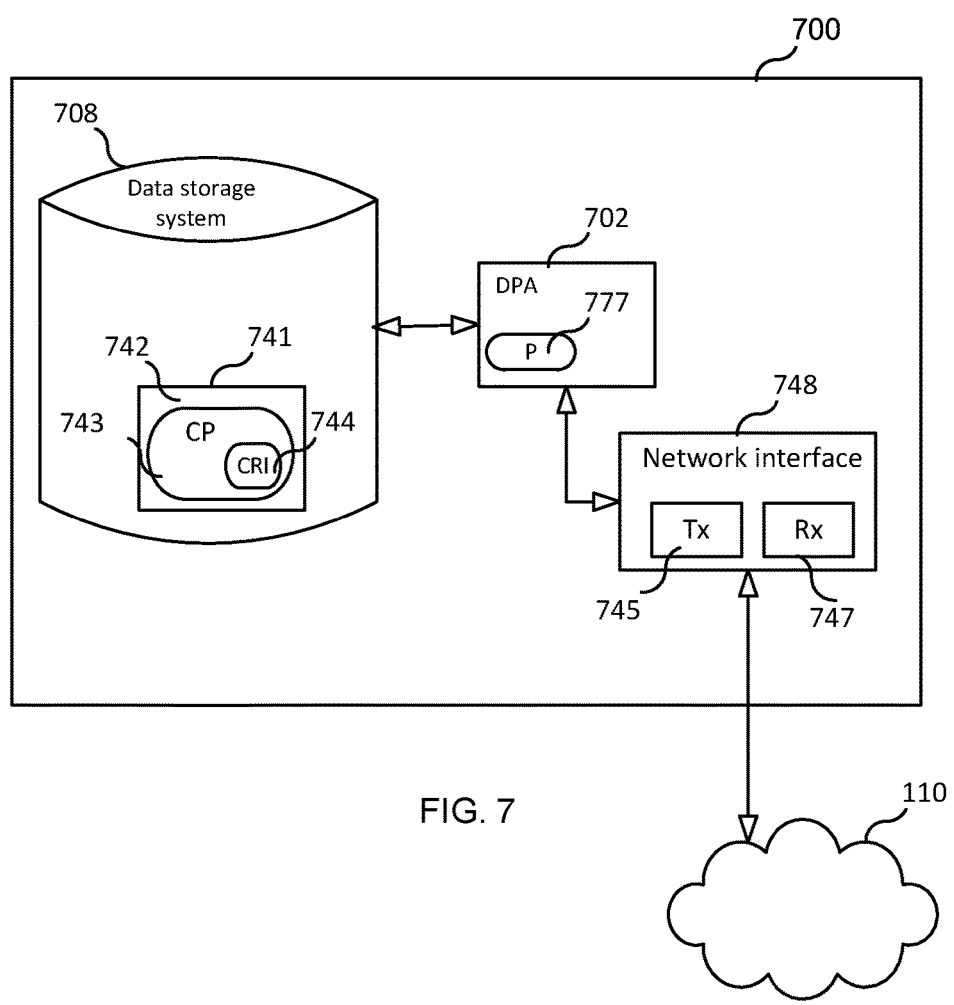
FIG. 7 is a block diagram of a computer apparatus according to some embodiments.

FIG. 7 is a block diagram of a computer apparatus 700 according to some embodiments for implementing the above described network node 102,306. As shown in FIG. 7, the computer apparatus may comprise: a data processing apparatus (DPA) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling computer apparatus to transmit data to and receive data from other nodes connected to a network 110 (e.g., an Internet Protocol (IP) network) to which network interface 748 is connected; and local storage unit (a.k.a., "data storage system") 708, which may include one or more non-volatile storage devices and/or one or more volatile storage devices (e.g., random access memory (RAM)). In embodiments where computer apparatus includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media, memory devices (e.g., random access memory), and the like. In some embodiments, the CRI 744 of computer program 743 is configured such that when executed by data processing apparatus 702, the CRI causes computer apparatus to perform steps described herein (e.g., steps described herein with reference to the flow charts and/or message flow diagrams). In other embodiments, computer apparatus may be configured to perform steps described herein without the need for code. That is, for example, data processing apparatus 702 may consist merely of one or more ASICs. Hence, the features of the embodiments described herein may be implemented in hardware and/or software.

Figure 8:
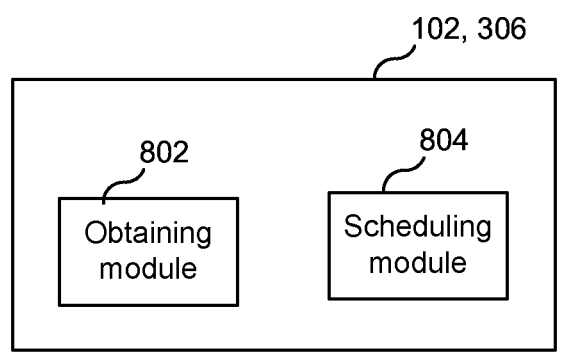
FIG. 8 is a diagram showing functional modules of a network node according to some embodiments.

FIG. 8 is a diagram showing functional modules of network node 102, 306 according to some embodiments. As shown in FIG. 8, the network node includes an obtaining module 802 and a scheduling module 804. The obtaining module 802 is configured to: i) obtain first candidate beam information identifying a first set of one or more candidate beams for WCD 104 that is being served by the network node, the first set of candidate beams for the first WCD comprising a first candidate beam having a first direction and 2) obtain second candidate beam information identifying a second set of one or more candidate beams for WCD 390 that is being served by the network node, the second set of candidate beams for the second WCD comprising a second candidate beam having a second direction. The scheduling module 804 is configured to schedule i) the transmission of first data to the first WCD and ii) the transmission of second data to the second WCD, wherein the scheduling module is configured to perform the scheduling of the transmissions using the first and second candidate beam information, and the scheduling of the transmissions comprises: selecting a transmission resource for use in transmitting the first data to the first WCD, selecting a transmission resource for use in transmitting the second data to the second WCD, and determining whether the first direction is different than the second direction.

While various embodiments of the present disclosure are described herein (including the appendices), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for interference avoidance, comprising:
    a network node obtaining first candidate beam information identifying a first set of one or more candidate beams for a first wireless communication device, WCD, being served by the network node, the first set of candidate beams for the first WCD comprising a first candidate beam having a first direction;
    the network node obtaining second candidate beam information identifying a second set of one or more candidate beams for a second WCD being served by the network node, the second set of candidate beams for the second WCD comprising a second candidate beam having a second direction; and
    the network node, using the first and second candidate beam information, scheduling i) the transmission of first data to the first WCD and the transmission of second data to the second WCD, wherein
    the scheduling of the transmissions comprises: selecting a transmission resource for use in transmitting the first data to the first WCD, selecting a transmission resource for use in transmitting the second data to the second WCD,
    selecting the transmission resource for use in transmitting the first data to the first WCD further comprises selecting a candidate beam from the first set of candidate beams for the first WCD, and
    selecting the transmission resource for use in transmitting the second data to the second WCD further comprises selecting a candidate beam from the second set of candidate beams for the second WCD,
    selecting a candidate beam from the first set of candidate beams for the first WCD comprises selecting a candidate beam from a first subset of candidate beams, wherein each candidate beam included in the first subset of candidate beams is a) included in the first set of candidate beams and b) not included in the second set of candidate beams, and
    selecting a candidate beam from the second set of candidate beams for the second WCD comprises selecting a candidate beam from a second subset of candidate beams, wherein each candidate beam included in the second subset of candidate beams is a) included in the second set of candidate beams and b) not included in the first set of candidate beams.

2. The method of claim 1, wherein
    selecting the transmission resource for use in transmitting the first data to the first WCD comprises selecting one or more of: i) a time slot during which the transmission of the first data to the first WCD will occur and ii) a frequency band in which the transmission of the first data to the first WCD will occur, and
    selecting the transmission resource for use in transmitting the second data to the second WCD comprises selecting one or more of: i) a time slot during which the transmission of the second data to the second WCD will occur and ii) a frequency band in which the transmission of the second data to the second WCD will occur.

3. The method of claim 1, wherein, scheduling i) the transmission of first data to the first WCD and ii) the transmission of second data to the second WCD using the first and second candidate beam information comprises:
    using the first and second candidate beam information to determine whether it is feasible to select the same time and frequency resources for the transmission of the first data to the first WCD and the transmission of the second data to the second WCD.

4. The method of claim 3, wherein the step of using the first and second candidate beam information to determine whether it is feasible to select the same time and frequency resources comprises:
    determining whether there is at least one beam included in the set of candidate beams for the first WCD that is not included in the set of candidate beams for the second WCD; and
    determining whether there is at least one beam included in the set of candidate beams for the second WCD that is not included in the set of candidate beams for first WCD.

5. The method of claim 4, wherein, as a result of determining that it is feasible to select the same time and frequency resources, the network node selects a time and frequency resource for the transmission of the first data and selects for the second transmission the same time and frequency resources that are selected for the transmission of the second data.

6. The method of claim 1, wherein
    the first beam is defined by a codebook entry identified by a pre-coder matrix index; and
    the method further comprises:
    the network node using the first beam to transmit a reference signal; and
    the network node receiving from the first WCD first channel state information comprising the pre-coder matrix index and first channel quality information.

7. The method of claim 6, wherein
    the network node is a base station having more antenna elements than antenna ports, and the method further comprises:
the network node using a third beam to transmit the reference signal, wherein the third beam is associated with the pre-coder matrix index,
after transmitting the reference signal using the third beam, the network node receiving from the first WCD second channel state information comprising the pre-coder matrix index and second channel quality information, and
the network node determining whether to add the third beam to the first set of candidate beams based on the second channel quality information received from the first WCD.

8. The method of claim 7, wherein the method further comprises:
the network node using a fourth beam to transmit the reference signal, wherein the fourth beam is associated with the pre-coder matrix index,
after transmitting the reference signal using the fourth beam, the network node receiving from the first WCD third channel state information comprising the pre-coder matrix index and third channel quality information, and
the network node determining whether to add the fourth beam to the first set of candidate beams based on the third channel quality information received from the first WCD.

9. The method of claim 8, wherein
the third beam is angularly shifted with respect to the first beam, and
the fourth beam is angularly shifted with respect to the first beam.

10. The method of claim 1, further comprising:
the network node obtaining the first data for transmission to the first WCD; and
the network node obtaining the second data for transmission to the second WCD.

11. The method of claim 1, wherein the network node is a base station comprising a scheduling function node, SF.

12. The method of claim 1, wherein the network node comprises a scheduling function node, SF, and the network node is not a base station.

13. A network node for interference avoidance, the network node comprising:
a computer readable medium; and
a data processing apparatus, comprising one or more processors, coupled to the computer readable medium, wherein the data processing apparatus is configured to:
obtain first candidate beam information identifying a first set of one or more candidate beams for a first wireless communication device, WCD, being served by the network node, the first set of candidate beams for the first WCD comprising a first candidate beam having a first direction;
obtain second candidate beam information identifying a second set of one or more candidate beams for a second WCD being served by the network node, the second set of candidate beams for the second WCD comprising a second candidate beam having a second direction; and
schedule i) the transmission of first data to the first WCD and ii) the transmission of second data to the second WCD, wherein
the data processing system is configured to perform the scheduling of the transmissions using the first and second candidate beam information,
the scheduling of the transmissions comprises: selecting a transmission resource for use in transmitting the first data to the first WCD, selecting a transmission resource for use in transmitting the second data to the second WCD, and determining whether the first direction is different than the second direction,
selecting the transmission resource for use in transmitting the first data to the first WCD further comprises selecting a candidate beam from the first set of candidate beams for the first WCD
selecting the transmission resource for use in transmitting the second data to the second WCD further comprises selecting a candidate beam from the second set of candidate beams for the second WCD,
the network node is configured to select a candidate beam from the first set of candidate beams for the first WCD by: 1) determining a first subset of candidate beams for the first WCD, wherein each candidate beam included in the first subset of candidate beams is a) included in the first set of candidate beams and b) not included in the second set of candidate beams; and 2) selecting a candidate beam from the first subset of candidate beams, and
the network node is configured to select a candidate beam from the second set of candidate beams for the second WCD by: 1) determining a second subset of candidate beams for the second WCD, wherein each candidate beam included in the second subset of candidate beams is a) included in the second set of candidate beams and b) not included in the first set of candidate beams; and 2) selecting a candidate beam from the second subset of candidate beams.

14. The network node of claim 13, wherein, scheduling i) the transmission of first data to the first WCD and ii) the transmission of second data to the second WCD using the first and second candidate beam information comprises:
using the first and second candidate beam information to determine whether it is feasible to select the same time and frequency resources for the transmission of the first data to the first WCD and the transmission of the second data to the second WCD.

15. The network node of claim 14, wherein the network node is configured to use the first and second candidate beam information to determine whether it is feasible to select the same time and frequency resources by performing a process comprising:
determining whether there is at least one beam included in the set of candidate beams for the first WCD that is not included in the set of candidate beams for the second WCD; and
determining whether there is at least one beam included in the set of candidate beams for the second WCD that is not included in the set of candidate beams for first WCD.

16. The network node of claim 15, wherein, the network node is configured such that, as a result of determining that it is feasible to select the same time and frequency resources, the network node selects a time and frequency resource for the transmission of the first data and selects for the second transmission the same time and frequency resources that are selected for the transmission of the second data.

17. The network node of claim 13, wherein
the first beam is defined by a codebook entry identified by a pre-coder matrix index; and
the network node is further configured to:
use the first beam to transmit a reference signal; and
receive from the first WCD first channel state information comprising the pre-coder matrix index and first channel quality information.

18. The network node of claim 17, wherein
the network node is a base station having more antenna elements than antenna ports, and
the network node is further configured to:
use a third beam to transmit the reference signal, wherein the third beam is associated with the pre-coder matrix index,
after transmitting the reference signal using the third beam, receive from the first WCD second channel state information comprising the pre-coder matrix index and second channel quality information, and
determine whether to add the third beam to the first set of candidate beams based on the second channel quality information received from the first WCD.

19. The network node of claim 18, wherein
the network node is further configured to: use a fourth beam to transmit the reference signal, wherein the fourth beam is associated with the pre-coder matrix index, after transmitting the reference signal using the fourth beam, receive from the first WCD third channel state information comprising the pre-coder matrix index and third channel quality information, and determine whether to add the fourth beam to the first set of candidate beams based on the third channel quality information received from the first WCD,
the third beam is angularly shifted with respect to the first beam, and
the fourth beam is angularly shifted with respect to the first beam.

20. A computer program product comprising a non-transitory computer readable medium storing a computer program comprising instructions which when executed by a data processing apparatus causes the data processing apparatus to perform the method of claim 1.

* * * * *